United States Patent

[11] 3,534,704

| [72] | Inventor | Hans A. Eckhardt,<br>55 Crescent Bend, Allendale, N.J.<br>07401 |
|---|---|---|
| [21] | Appl. No. | 747,397 |
| [22] | Filed | July 24, 1968 |
| [45] | Patented | Oct. 20, 1970 |

[54] MEANS FOR INDICATING THE DIRECTION OF MOVEMENT
8 Claims, 10 Drawing Figs.

[52] U.S. Cl. .................................................. 116/114
[51] Int. Cl. .................................................. G01d 21/00
[50] Field of Search .......................................... 116/114,
125, 114.8, 130, 131, 133; 35/38, 39; 40/2(A), 28,
300; 49/348, 353; 160/5, 172, 188

[56] References Cited
UNITED STATES PATENTS

| 501,497 | 7/1893 | Ferrell | 116/125 |
| 1,371,395 | 3/1921 | Rast | 116/114UX |
| 1,567,306 | 12/1925 | Straitz | 116/125 |
| 2,581,207 | 1/1952 | Sambleson | 116/114 |
| 3,212,718 | 10/1965 | Green | 116/125X |

FOREIGN PATENTS

| 449,043 | 12/1912 | France | 49/353 |

*Primary Examiner*—Louis J. Capozi

ABSTRACT: Means for indicating the direction of movement of a window comprise an indicator body advising in which direction to turn a crank to open or close the window, even in darkness, for blind persons and children. The indicator body includes a tipped depressed body portion for turning the crank in one direction, and a sign, symbol, or letters meaning "to open" for the resulting direction of movement of the window. A reverse tipped raised body portion for turning the crank in the reverse direction is combined with a sign, symbol or letters meaning "to close" for the opposite direction of movement. The signs, symbols and tipped body portions are depressed for the direction of opening, while they are full, raised for the direction of closing.

Patented Oct. 20, 1970
3,534,704
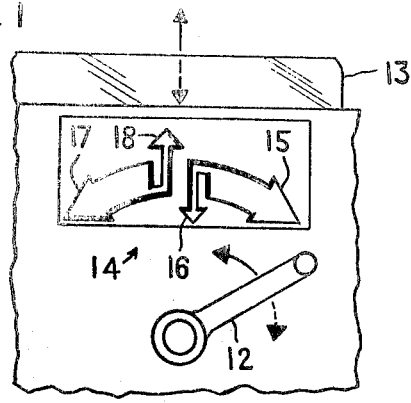
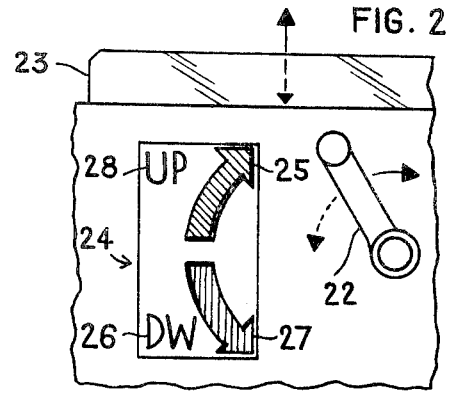
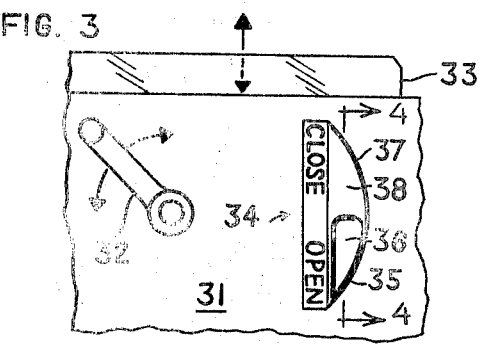
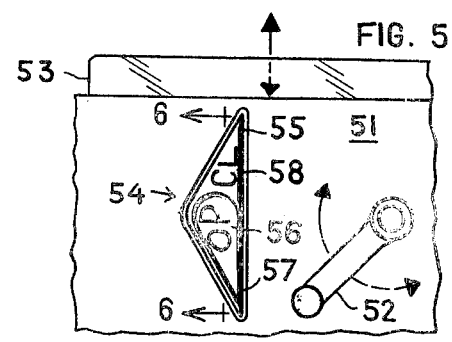
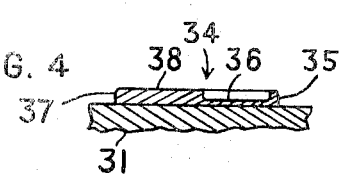
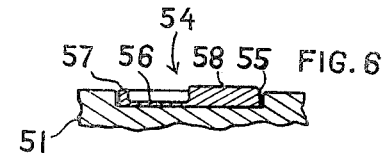
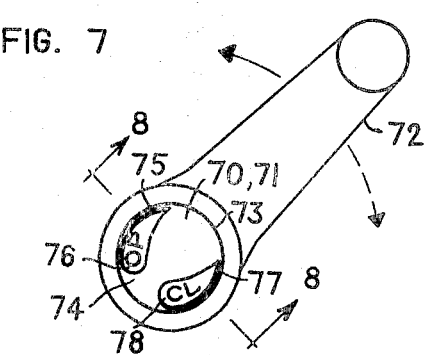
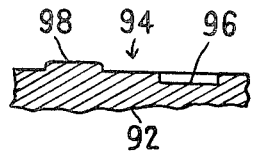
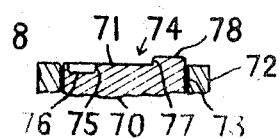
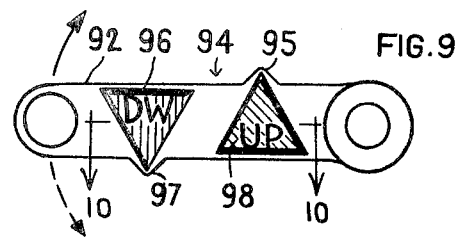
INVENTOR.
HANS A. ECKHARDT
BY
H. A. Eckhardt

MEANS FOR INDICATING THE DIRECTION OF MOVEMENT

The present invention relates to the field of indicating the direction of movement and more particularly the direction of movement of a window.

Many windows, especially those in automobiles, are opened and closed by turning a crank in two different directions. Since they offer reliability, simplicity and economy they are largely preferred over power operated windows.

If the position of a window is partially open or closed, the direction for turning the crank to further open or to further close the window is usually found by trial and error. When the window is completely closed, however, even persons accustomed to operate that window's crank often do not recall the direction in which the crank has to be turned to open the window. This fact is easily understood if one considers that in millions of late-model cars the window cranks on different sides of one and the same car have to be turned in different directions in order to open them. In millions of recent cars, the main window and the vent window in the left car door have to be opened by cranking in one direction, while in the right door of the same car only the vent window operates in the same direction, contrary to the main window which has to be cranked open in the opposite direction. Similarly whenever the window is completely open, few people remember the direction in which the crank has to be turned in order to close the window. As a result completely open windows are frequently cranked further into the direction of opening. Entirely closed windows are often forced more and more in the direction of closing. Such a mishandling of the window cranks causes them to get loose, and uneven in their operation. In motor vehicles such loose and overworked window cranks are among the most frequent and annoying causes for rattles and repair efforts.

While many persons do not recall the turning directions for the window cranks in the normal day-to-day situation, an even greater number of people fails to remember the crank directions under the effect of time pressure, panic, shock or injuries. In traffic accidents many people have died in their burning cars because, with the car doors jammed, the windows often became inoperable in the closed position and stuck there, because the passenger had forced the window cranks more and more in the wrong direction.

If persons are asked in which direction the cranks of the right and left front windows of their cars have to be turned to open, very few recall the right direction even if they drive daily one and the same car. The confusion has become even greater, since families now frequently have a second car, and also because rented cars of all types and models are more widely used.

To avoid the dangers and the mishandling described above, the present invention has as its main object the reliable indication of the direction in which the window crank has to be turned in order to open or close, respectively, a car window.

Another object is to indicate the direction in which the crank has to be turned to blind persons, children and others unable to read.

A further object is to advise the direction of crank movement in darkness, and when the lighting system of the car is malfunctioning.

The invention and its novel features will be more apparent from the following description taken in connection with the accompanying drawings in which:

FIG. 1. shows a view of one embodiment of the invention;
FIG. 2 is a view of another embodiment;
FIG. 3 illustrates a further embodiment of the invention;
FIG. 4 is a sectional view along the lines 4–4 in FIG. 3;
FIG. 5 depicts a view of a further embodiment of the invention;
FIG. 6 is a sectional view along the lines 6–6 in FIG. 5;
FIG. 7 portrays a view of still another embodiment;
FIG. 8 is a sectional view along the lines 8–8 in FIG. 7;
FIG. 9 shows a view of a further embodiment;
FIG. 10 is a sectional view along the lines 10–10 in FIG. 9.

Referring to the drawings, FIG. 1, 12 is a crank turnable in two opposite directions for moving a window 13 in two opposite directions. An indicator body 14 advises in which direction to turn the crank 12 in order to move the window 13 in one direction, and in which reverse direction to turn said crank 12 in order to move the window 13 in the opposite direction. The indicator body 14 comprises a depressed body portion 15 pointed in one direction of turning the crank 12, with a second depressed body portion 16 for the resulting movement of the window 13, and a raised body portion 17 pointed in the reverse direction of turning the crank 12 with a second raised body portion 18 for the resulting opposite movement of the window 13.

In FIG. 2 a crank 22 is turnable in two opposite directions for moving a window 23 in two opposite directions. An indicator body 24 advises in which direction to turn the crank 22 in order to move the window 23 in the upward direction and in which reverse direction to turn the crank 22 in order to move the window 23 in the downward, opposite direction. The indicator body 24 comprises a tipped raised body portion 25 for turning the crank 22 in clockwise direction with a symbol 28 meaning "up" for the resulting movement of the window 23, and a reverse tipped depressed body portion 27 for turning the crank 22 in the reverse, counterclockwise direction with a symbol 26 meaning "down" for the resulting opposite, downward movement of the window 23.

In addition, as a symbol meaning "up" the raised body portion 25 is in green color, and as a symbol meaning "down" the reverse depressed body portion 27 is in red color, as generally known to the public from elevators in buildings. As an alternative, another part of the upper half or the entire upper half of the indicator body 24 can be colored green, while a corresponding part of the lower half, or the entire lower half of the indicator body 24 will then be colored red.

In FIGS. 3 and 4, the indicator body 34 attached to the car door 31 comprises a depressed body portion 36 for turning the crank 32 in clockwise direction with a tip 35 meaning "to open" for the resulting opening direction of movement of the window 33, and a raised body portion 38 for turning the crank 32 in the reverse, counterclockwise direction with a tip 37 meaning "to close" for the resulting closing direction of movement of the window 32.

The depressed body portion 36 meaning "to open" is an arrow-shaped recess resembling an open window frame and at the same time pointing in the direction of downward movement of the window 33. The raised body portion 38 meaning "to close" has a raised arrow-shaped surface resembling a closed window, or full window frame, and points at the same time in the direction of upward movement of the window 33. Thus the directional tips 35 and 37 of the body portions 36 and 38 can be "read" by passengers who cannot read conventional writings, such as blind persons, children, and by all other persons during night time. In addition, for the majority of passengers and for daytime driving, the words "close" and "open" are provided.

In FIGS. 5 and 6, the crank 52 is mounted in the car door 51 and turnable in two opposite directions for moving the window 53 in two opposite directions. The indicator body 54 is attached to the car door 51 and recessed therein, and comprises a tip 55 in the clockwise direction of turning the crank 52, within a raised body portion 58, for the resulting closing movement of the window 53. The indicator body 54 also includes a reverse tip 57 in the counterclockwise direction of turning the crank 52, within a depressed body portion 56, for the resulting opening movement of the window 53.

The depressed body portion 56 has an arrow-shaped surface recessed in the surface of the indicator body 54 resembling an open window frame and at the same time pointing in the direction of downward movement of the window 53. The raised body portion 58 has a raised, full, arrow-shaped surface resembling a closed window, or full window frame, and at the same time points in the direction of closing movement of the window 53. The raised body portion 58 includes the letters "CL" which stand for "close" as well as for "clockwise", while the depressed body portion 56 comprises the letters "OP" for opening the window. As a result the body portions 56 and 58 can also be "read" by passengers unable to read conventional letters, such as blind persons, children, as well as by all other persons even during night time.

In FIGS. 7 and 8, a crank shaft 70 of a crank shaft 72 extends with the visible end 71 through an opening 73 in the crank 72 and carries on that end 71 an indicator body 74 advising in which direction to turn the crank 72. The indicator body 74 comprises a directional tip 75 for turning the crank 72 in the clockwise direction, within a depressed body portion 76, meaning "to open" for the resulting opening direction of movement of the window, and a reverse directional tip 77 for turning the crank 72 in the reverse, counterclockwise direction, within a raised body portion 78, meaning "to close" for the resulting closing direction of movement of that window. The depressed body portion 76 meaning "to open" has an arrow-shaped recess resembling an open window frame and the letters "OP" standing for "to open". The raised body portion 78 meaning "to close" has a raised arrow-shaped surface resembling a closed window or a full window frame, and the letters "CL" standing for "to close".

In FIGS. 9 and 10, a crank 92 carries an indicator body 94 advising in which direction to turn the crank 92 in order to open or close a window (not shown). The indicator body 94 comprises a tip 95 in the clockwise direction of turning the crank 92 with a raised body portion 98 for the resulting upward movement of that window. The indicator body 94 also includes a reverse tip 97 in the counterclockwise direction of turning the crank 92 with a depressed body portion 96 for the resulting downward movement of the window.

The depressed body portion 96 has an arrow-shaped surface recessed in the crank 92 resembling an open window frame, red color, and the letters "DW" which stand for downward movement of the window. The raised body portion 98 has a raised arrow-shaped surface on the crank 92 resembling a closed window, a full window frame, green color and the letters "UP" which stand for upward movement of the window.

Signs and symbols shown in various embodiments can be "read" even in the dark, and even by blind persons and small children. For most passengers it will be a convenience to have the indicating signs and symbols illuminated by direct lighting or by using fiber-optics technology. To make indicating signs or symbols distinguishable even in such cases where the car's electric lighting system does not function, as in certain accidents, indicating signs and symbols can be made visible by providing means utilizing luminescence or fluorescence.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:
1. Means for indicating the direction of movement comprising:
   A crank turnable in two opposite directions, said crank being mechanically connected to a window for moving said window in two opposite directions, so that by turning the crank in one direction the window is moved to open, and by turning the crank in the opposite direction, the window is moved to close; and
   an indicator body at said crank having a depressed body portion formed therein with a width decreasing in the direction in which said crank must be turned to open said window.

2. Means for indicating the direction of movement as claimed in claim 1 wherein the indicator body has a raised body portion formed therein with a width decreasing in the direction in which said crank must be turned to close the window.

3. Means for indicating the direction of movement as claimed in claim 1 wherein the depressed body portion of the indicator body decreases in width to a tip in the direction in which said crank must be turned to open the window, and has a symbol meaning "to open" for the direction of movement of said window.

4. Means for indicating the direction of movement as claimed in claim 1 wherein the indicator body comprises a raised body portion decreasing in width to a tip in the direction in which said crank must be turned to close the window, and a symbol meaning "to close" for the direction of movement of said window.

5. Means for indicating the direction of movement as claimed in claim 2 wherein the indicator body comprises a tipped depressed body portion having a width decreasing in the direction in which said crank must be turned to open the window with a symbol meaning "to open" for the resulting direction of movement of said window, and a tipped raised body portion having a width decreasing in the direction in which said crank must be turned to close the window with a symbol meaning "to close" for the opposite direction of movement of said window.

6. Means for indicating the direction of movement as claimed in claim 2 wherein the indicator body comprises a second depressed body portion formed therein with a width decreasing in the direction in which the window moves to open, and a second raised body portion formed therein with a width decreasing in the direction in which the window moves to close.

7. Means for indicating the direction of movement as claimed in claim 1 wherein said indicator body forms part of said crank.

8. Means for indicating the direction of movement as claimed in claim 1 wherein said indicator body is illuminated by means for rendering visible said indicator body under low light conditions, said means being selected from those of luminescence and fluorescence.